United States Patent [19]
Yoshida et al.

[11] Patent Number: 5,117,100
[45] Date of Patent: May 26, 1992

[54] APPARATUS FOR AND METHOD OF OPTICAL POSITION DETECTION

[75] Inventors: Shigeo Yoshida; Isamu Fujimoto, both of Chiba; Hideyuki Suzuki, Tokyo; Hiroshi Asano, Saitama; Toru Hosaka, Tokyo; Takashi Onioh, Chiba; Kojyu Nagasaki, Tokyo; Kenichi Matsuoka, Tokyo; Kazufumi Taura, Tokyo, all of Japan

[73] Assignee: Dowa Mining Co., Ltd., Tokyo, Japan

[21] Appl. No.: 634,566

[22] Filed: Dec. 27, 1990

[30] Foreign Application Priority Data

Dec. 27, 1989 [JP] Japan .................................. 1-338976

[51] Int. Cl.⁵ ............................................. G01V 9/04
[52] U.S. Cl. .................................. 250/221; 250/222.1; 250/561
[58] Field of Search ............... 250/222.1, 221, 560, 250/561; 340/555-557

[56] References Cited

U.S. PATENT DOCUMENTS

| | | | |
|---|---|---|---|
| 4,559,452 | 12/1985 | Igaki et al. | 250/222.1 |
| 4,566,337 | 1/1986 | Smart | 250/222.1 |
| 4,645,920 | 2/1987 | Carroll et al. | 250/222.1 |
| 4,652,741 | 3/1987 | Golborne | 250/222.1 |
| 5,051,574 | 9/1991 | Yoshida et al. | 250/221 |

Primary Examiner—David C. Nelms
Assistant Examiner—Michael Messinger
Attorney, Agent, or Firm—Cushman, Darby & Cushman

[57] ABSTRACT

The present optical position detection method and the apparatus therefor is adapted to compute an arithmetic mean of the adjusted light reception values received by adjacent photodetectors as the virtual light reception value at the virtual position, compare not only the adjusted light reception values of the respective photodetectors but also the virtual light reception values with the reference level and utilize the virtual position also as the light interruption position data when light interruption is determined, thus enhancing the accuracy of detecting the position of an object.

3 Claims, 5 Drawing Sheets

APPARATUS FOR AND METHOD OF OPTICAL POSITION DETECTION

BACKGROUND OF THE INVENTION

The present invention relates to a method of optically detecting the position of an object and the apparatus therefor.

An optical position detection apparatus has been known as shown in FIG. 1(A), said apparatus comprising a detection panel constituted by plural pairs of light emitting devices and photodetectors, each pair of said light emitting device 1 and said photodetector 2 being spaced from each other by a specified distance, and capable of detecting the position of an object 3 on said panel by sequentially moving a pair of said devices. Furthermore, in order to solve the problem of a possible variation in the light reception value of each light emitting device possibly arising even when no light emitted from said light emitting devices 1 toward the corresponding photodetectors is interrupted by an object, a detection apparatus has been developed by the applicant of the present invention and filed for as patent application on Jun. 29, 1990, as application Ser. No. 07/154,559, the detection apparatus being provided with a function of adjusting to be constant the light reception values of the respective photodetectors when there is no light being interrupted by a target. The adjusting function of said detection apparatus is also incorporated in an embodiment of the present invention. In short, when there is no light interrupted by an object and the light emitting drive value for the respective light emitting devices is equal, any variation in the respective light reception value of the respective light emitting devices is detected, the individual light emitting drive value necessary for driving each light emitting device is computed in accordance with the detected respective light reception value and stored, and the detected variation of the light reception values is adjusted in accordance with the individual light emitting drive value so that the respective light reception value becomes uniform when there is no light being interrupted by an object.

FIG. 1(B) illustrates the presence and absence of light interruption by an object detected at the respective photodetectors (light interruption being caused by the presence of "touch" at the panel) in the optical position detection apparatus incorporating the adjustment function as above described. The abscissa designates the corrdinate of the respective photodetectors and the ordinate indicates the results of optical detection which can be indicated as a presence or absence of the light interruption by an object as the result of comparing the respectively adjusted light reception value with the reference level which is set to determine a presence or absence of light interruption.

According to the conventional method and apparatus of optically detecting a position, the light reception value of the respective photodetectors is detected as a signal to indicate it to be either above or below the reference level, or presence or absence of an object regardless of said adjusting function. In this sense, the accuracy for detecting the position of an object had to be attained only by the resolution equivalent to half of the light corresponding a pitch between photodetectors. For example, in FIG. 1(B), since the abscissa 4 and 5 are detected to indicate the presence of light interruption, the position of an object is detected as the abscissa of $(4+5)/2=4.5$. In order to solve this problem, a method and an apparatus of optically detecting a position which is capable of detecting the position of an object with an accuracy of more than $\frac{1}{2}$ of the pitch (or length) between adjacent photodetectors has been demanded.

Accordingly, an object of the present invention is to provide a method and an apparatus of optically detecting a position which is capable of improving the accuracy of detecting the position of an object at least more than $\frac{1}{2}$ pitch.

SUMMARY OF THE INVENTION

The present invention relates to an optical position detection apparatus adapted to detect the position of an object by adjusting the light reception value of the respective photodetectors and eliminate variation of the light reception values when there is no light interrupted by an object of the light emitted toward the photodetectors from the light emitting devices and comparing the adjusted light reception values with the reference level, said detection apparatus comprising a first computing control means for computing at least the virtual medial position and the virtual light reception value between two adjacent photodetectors by means of arithmetic means in accordance with the adjusted light reception value of one photodetector and the adjusted light reception value of the adjacent photodetector, a comparison means for comparing said virtual light reception value and the adjusted light reception value from the respective photodetectors with the reference level so as to determine a presence or absence of the light interruption by an object, a memory means for storing the position of the corresponding photodetector and said virtual position as a light interruption position data when presence of the light interruption is decided by the comparison means, and a second computing control means for computing the arithmetic means of the maximum and minimum light interruption position data as a position of the object interrupting the light when light interruption position data for a series of positions are stored in the memory means.

According to the present invention, the arithmetic mean of the adjusted light reception value received by adjacent photodetectors is computed as the virtual light reception value at the virtual medial position, the virtual light reception value is compared with the reference level in addition to the adjusted light reception value of the respective photodetectors, and the virtual position is also stored as the light interruption position data when there is light interruption and used as the data for computing the light interruption position of an object, whereby the position of an object may be more precisely detected than when detected only in accordance with the position of a photodetector.

DETAILED DESCRIPTION OF THE INVENTION

Figure 2:
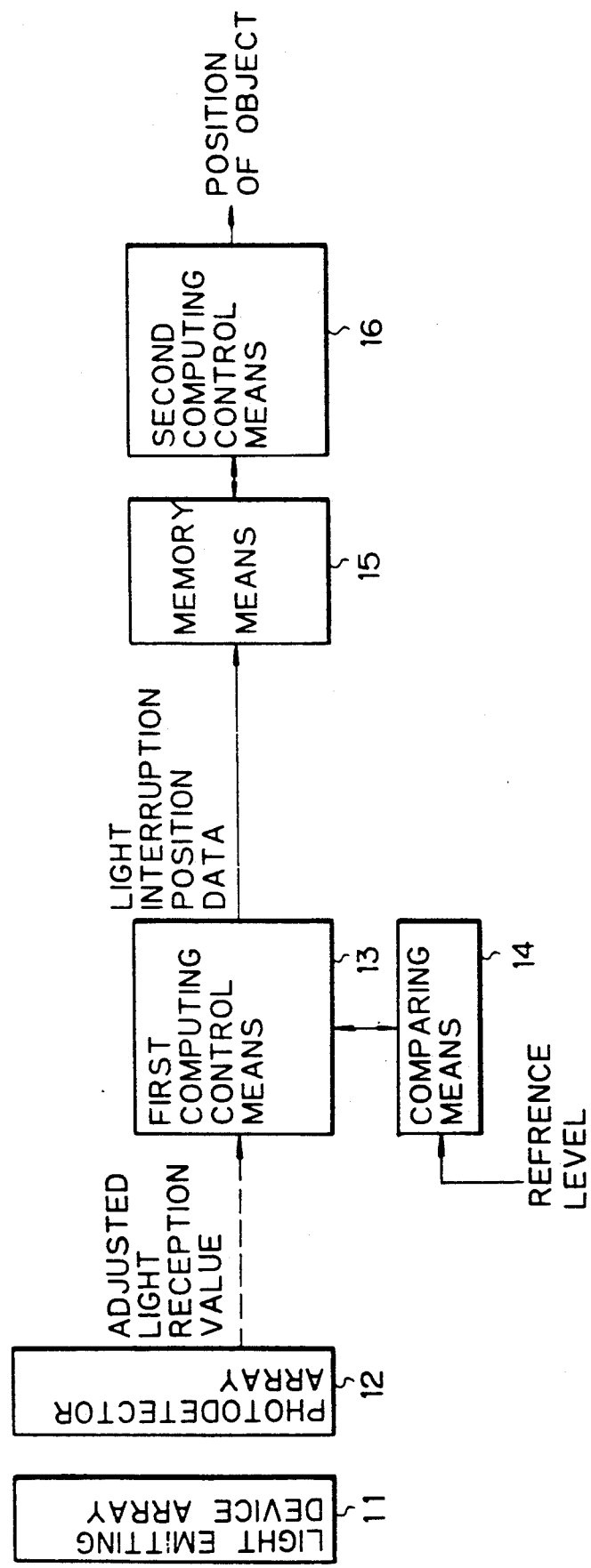
FIG. 2 is the block diagram illustrating the constitution of the present invention.

FIG. 2 is the block diagram explaining the general concept of the apparatus according to the present invention and how the position of an object between the light emitting device array 11 and the photodetector array 12 is detected. Variation of respective light reception values of the photodetectors are adjusted. When there is no object and input to the first computing control means 13, the virtual reception values of at least adjacent photodetectors are computed in the computing control means and then output to the comparison means 14 successively together with the adjusted light reception values and compared to the reference level. If the result of comparison indicates that there is light interruption, the corresponding photodetector and the virtual position are output from the first computing control means 13 to the memory means 15 and stored therein as the light interruption position data. The second computing control means 16 is adapted to compute the position of an object in accordance with the light interruption position data from the memory means.

Figure 3:
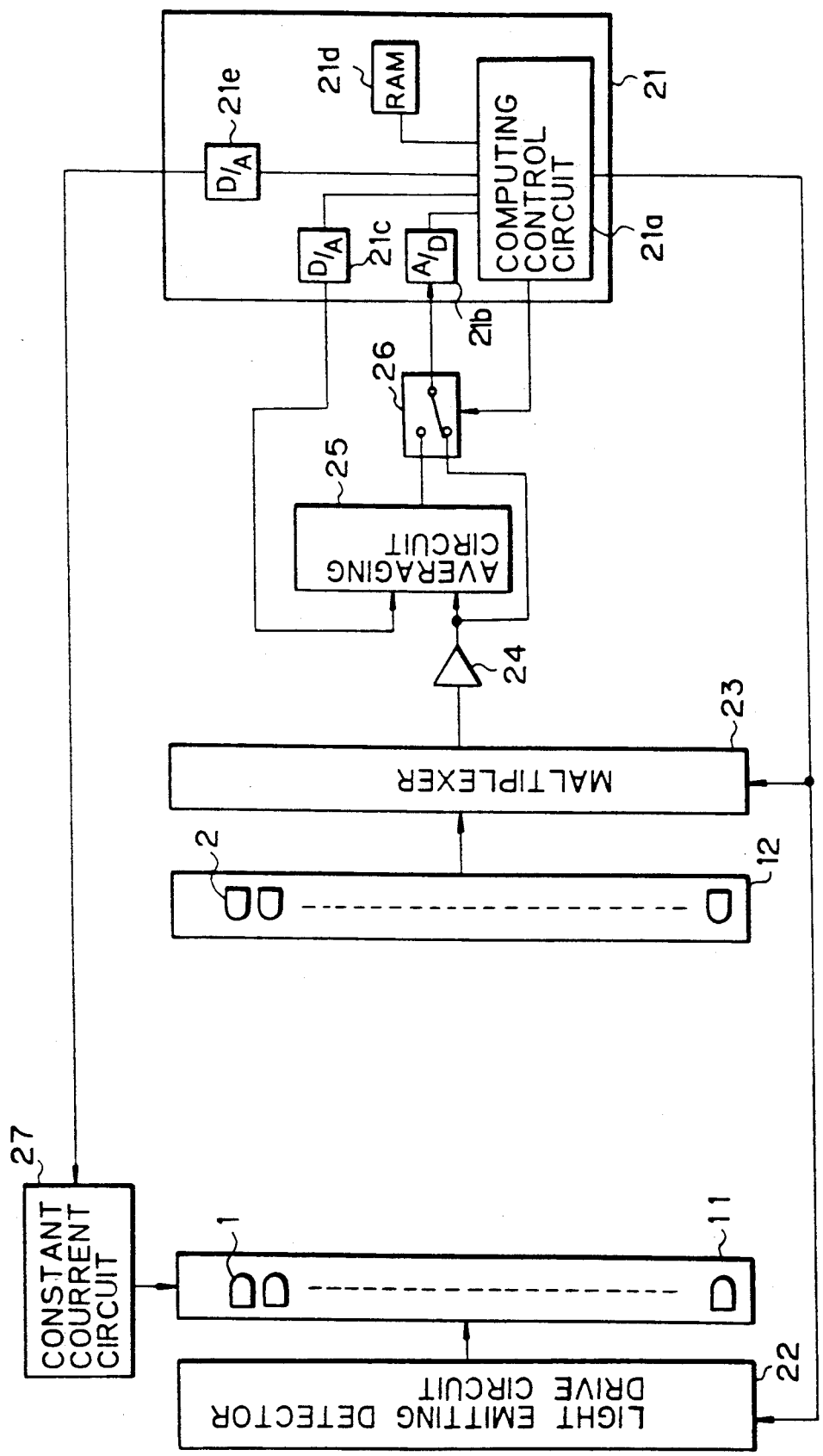
FIG. 3 is a diagram illustrating the constitution of the overall system of an embodiment of the present invention, FIG. 4 schematically explains how the position of an object is detected according to the present invention.

The present invention will be explained in more detail by referring to FIG. 3 through FIG. 5. FIG. 3 is a schematic block diagram of a system constitution illustrating an embodiment of the present invention. In FIG. 3, the computing control circuit 21a incorporated in the microprocessor 21 is adapted to sequentially scan the light emitting device drive circuit 22 and the multiplexer 23 to cause a pair of the light emitting device 1 and the photodetector 2 to be sequentially operable. The signal representing the light reception value provided from the photodetector 2 in an operable condition via the multiplexer 23 is supplied to the averaging circuit 25 and one of the input terminals of the change-over switch 26 via the amplifier 24 and the output from the averaging circuit 25 is supplied to the other of the input terminals of the change-over switch 26. The output of the change-over switch 26 is provided to the computing control circuit 21a via analog/digital (A/D) converter circuit 21b. The computing control circuit 21a is adapted to control change-over to the averaging circuit 25 and provide the adjusted light reception value input from the photodetector 2 to the averaging circuit 25 via the digital/analog (D/A) converter 21c.

The microprocessor 21 is also provided with RAM 21d which is adapted to store the data representing the individual light reception value of the respective photodetectors in accordance with the command from the computing control circuit 21a when there is no light interruption. The computing control circuit 21a is adapted to compute the individual control drive data required for controlling the light emitting drive of the respective light emitting devices 1 by running a required computing operation based on the data stored in RAM 21d and store the data again in RAM 21d. The computing control circuit 21a is adapted to provide the control signal based on the individual control drive data for each light emitting device 1 to the constant current circuit 27 via the D/A converter 21e and supply the individual light emitting drive current output to the light emitting device which are in an operable condition and drive the devices for light emitting. As a result, when there is no light interruption by an object, the light reception values of the respective light emitting devices are adjusted to a uniform value and the adjusted light reception values may be provided from the respective photodetectors. It is, however, to be understood that detailed explanation in this respect is not provided since it does not form an essential part of the invention.

The operation of the apparatus is above described which relates to the present invention will next be explained. Suppose that the change-over switch 26 has one of the input terminals thereof connected. The adjusted light reception value provided from "n" th photodetector 2 is supplied to the computing control circuit 21a via the change-over switch 26 and the A/D converter 21b and stored therein. It is also supplied to the averaging circuit 25 via the D/A converter 21c and read out. Then, adjusted light reception value from "n+1"th photodetector is input to the averaging circuit 25 via the amplifier 25. And the arithmetic mean value is searched between the "n+1"th and "n"th adjusted light reception values and assumed as the virtual light reception value at the medial position between "n"th and "n+1"th photodetectors. At this time, the other of the input terminals of the change-over switch 26 is connected, such that the virtual light reception value is provided to the computing control circuit 21a via the switch and the A/D converter 21b. Next, one of the input terminals of the change-over switch 26 is connected and the "n+1"th adjusted light reception value is input to the computing control circuit 21a. The above-described operation is repeated for each photodetector as scanned and the virtual light reception values of all adjacent photodetectors are computed and input to the computing control circuit 21a.

Figure 1:
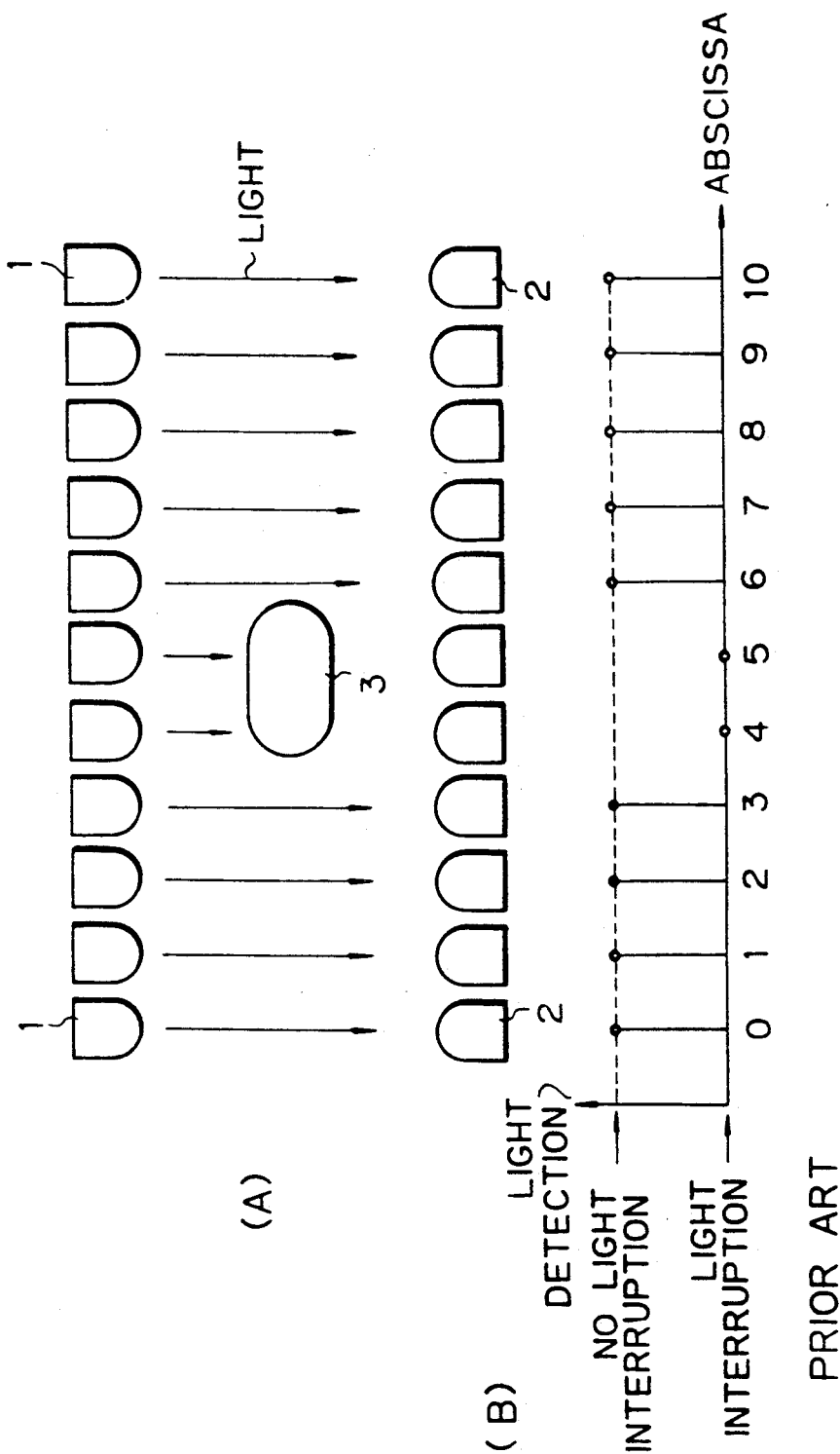
FIG. 1 schematically explains how the position of an object is detected by the apparatus according to a prior art.
Figure 4:
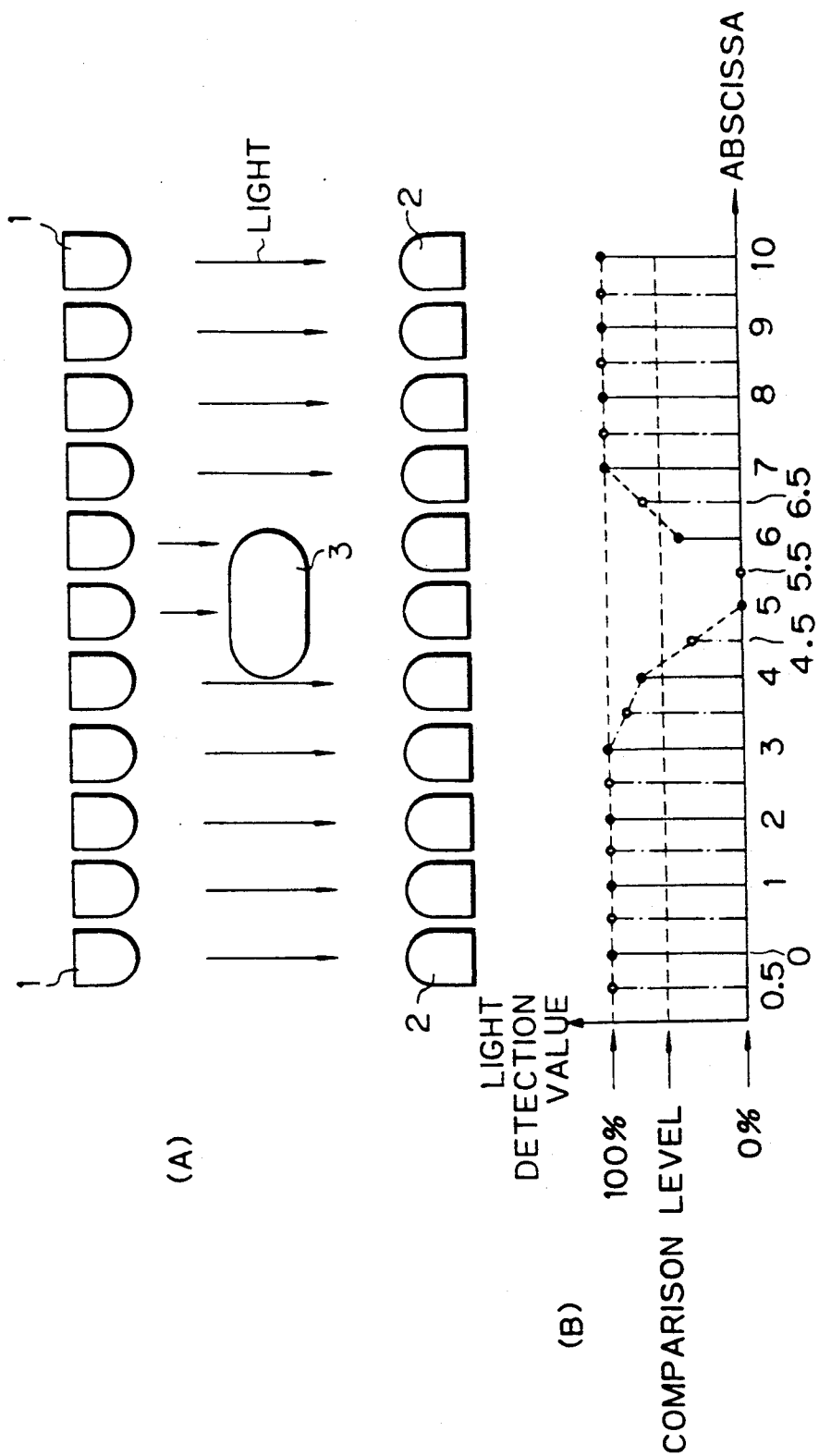
Figure 5:
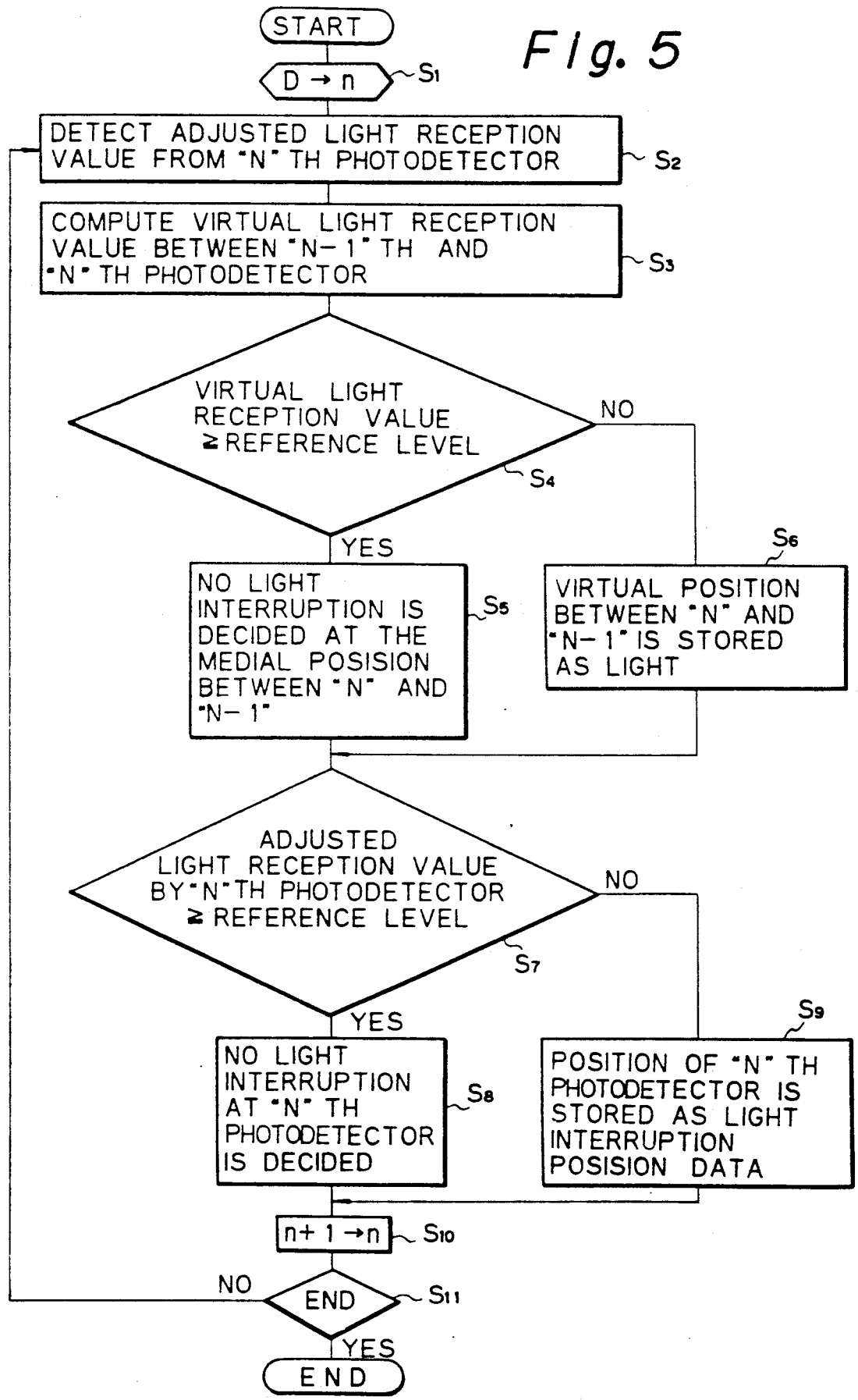
FIG. 5 is a flow chart illustrating operation of another embodiment of the present invention.

FIG. 4 explains how the position of an object is detected in contrast with the illustration in FIG. 1. In FIG. 4(B), there are shown the adjusted light reception values and the virtual light reception values, corresponding to the respective photodetectors which have been computed in the manner as above described. It is to be understood that the ordinate is represented in a scale of from 100% which indicates no light interruption to 0% which indicates complete light interruption. The incomplete light interruption takes the value varying between 0% and 100%. The respective adjusted light reception values expressed in % and the virtual light reception values are compared with the reference level in the computing control circuit 21a. In the example shown in FIG. 4, the adjusted light reception values corresponding to the abscissa 5 and 6 as well as the virtual light reception values at the virtual positions corresponding to the abscissa 4.5 and 5.5 are decided to include light interruption (there are "touch" on the panel) and other light reception values are decided to not include any light interruption. More specifically, between the adjusted light reception value at the abscissa 4 and the adjusted light reception value at the abscissa 5 having 0% value, the adjusted light reception value is assumed to vary linearly. Light interruption is decided when the virtual light reception value at the abscissa 4.5 goes below the reference level. Similarly, it is decided that there is no light interruption when the virtual light reception value at the virtual position corresponding to the abscissa 6.5 becomes higher than the reference level.

The computing control circuit 21a is assumed to further perform the following operation. The abscissa 4.5, 5, 5.6 and 6 of the photodetectors and the virtual positions in FIG. 4 for which light interruption has been decided are stored as the light interruption position data. And when the first scanning interval is completed, the light interruption position is computed based on said light interruption data and output for display. In case of the present example, since the light interruption position data are sequentially stored for every 0.5 pitch which is the distance for deciding on the presence of light interruption, the arithmetic mean of the min. light interruption data 4.5 and the max. light interruption data 6, i.e., (4.5+6)/2=5.25 is computed as the position of light interruption by an object and output for display. In this way, the detection accuracy which used to be every 0.5 pitch according to a prior art can now be improved to 0.25 pitch or four time accuracy. In the case of detecting a position with two time accuracy, the light interruption position of 5.25 may be taken as either 5.5 or 5.0.

It is further possible for the present invention to be applied for position detection with more than eight time accuracy. In the case of the example shown in FIG. 4, the second virtual light reception value is computed by obtaining the arithmetic mean of the virtual light reception value at the abscissa 4.5 and the adjusted light reception value at the abscissa 5 while the second virtual light reception value is computed by obtaining the arithmetic mean of the adjusted light reception value at the abscissa 6 and the virtual light reception value at the abscissa 6.5. The respective second virtual light reception values are compared to the reference level to determine a presence or absence of light interruption. In the case of a presence of light interruption, the second virtual position is taken as the light interruption position data so that position detection can be conducted mode with eight time accuracy.

Although FIG. 3 has concretely illustrated the constitution of hardware for computing the virtual light reception value between two adjacent photodetectors, the other constitution shown in FIG. 2 for searching the position of an object can be incorporated in the computing control circuit 21a and a position detection operation may be executed as described above.

In FIG. 3, it is also possible to eliminate the averaging circuit 25, the change-over switch 26 and the D/A converter 21c, but to input the adjusted light reception value from the respective photodetectors directly into the A/D converter and to the computing control circuit 21a including such a constitution as shown in FIG. 2. In this case, the flow as shown in FIG. 5 can be executed in the computing control circuit 21a. In FIG. 5, "n"th photodetector is written to 0 and initialization is executed to scan the first abscissa of the photodetector. Then, the process proceeds to step $S_2$ where "n"th light emitting device and the photodetector are driven to feed the adjusted light reception value to the computing control circuit 21a. Then, the process proceeds to step $S_3$ where the arithmetic mean value of the light reception value obtained from the "n−1"th photodetector and the light reception value obtained from "n"the photodetector is computed and compared with the reference level in the step $S_4$. If the virtual reception value is larger than the reference level, the process proceeds to step $S_7$. On the other hand if the virtual light reception value is determined to be smaller than the reference level, the process proceeds to step $S_6$ where presence of the light interruption at the virtual position is decided and the virtual position is stored as light interruption position data. Then the process proceeds to step $S_7$. In the step $S_7$, the adjusted light reception value of the "n"th photodetector is compared with the reference level. If it is larger than the reference level, it is decided in the step $S_8$ that the photodetector senses no light interruption and the process proceeds to step $S_{10}$. If the adjusted light reception value of "n"th photodetector is smaller than the reference level, then process proceeds to step $S_9$ where the "n"th photodetector resistors light interruption and the position of "n"th photodetector is stored as the light interruption position data. Subsequently, the process proceeds to step $S_{10}$. In the step $S_{10}$, scanning of the "n"th photodetector is updated to "n+1"th photodetector. In step $S_{11}$, a decision is made to check whether scanning of all photodetectors has been completed or not. If completion is decided as YES, one cycle of scanning is over. If the above decision indicated NO, the process returns to step $S_2$ and the above-mentioned steps $S_2$-$S_{11}$ are repeated. In the case of n=0, the steps $S_2$-$S_6$ are skipped over. When one cycle of scanning is over and the light is interrupted by an object, the light interruption position data will be stored. When there is only one light interruption position datum available, the datum is output for display as the light interruption position. In the meantime when the light interruption position data are serially stored, the arithmetic mean between the min. light interruption position data and the max. light interruption position data will be output for display as the light interruption position.

In the embodiment as above described, although the present invention has been applied to an apparatus wherein the light reception values of the respective photodetectors when there is no light interruption are always adjusted to constant values, it can be equally applied to such an apparatus where the light reception values of the respective photodetectors when there is no light interruption are stored individually and during position detection operation, the detected light reception values of the respective photodetectors are compared with the corresponding individually stored light reception values to obtain their ratios (%) which are utilized as adjusted light reception values which have eliminated any variation in value between the respective photodetectors.

The optical position detection method and the apparatus therefor according to the present invention provides excellent resolution which allows the position of an object to be detected with an accuracy at least two times that of the conventional method and apparatus. This will permit the position of an object to be displayed with precision by a cursor on CRT picture plane as if displayed by a mouse.

While the present invention has been described in connection with a preferred embodiment thereof, it will be understood that it is not intended to limit the invention only to that embodiment. On the contrary, it is intended to cover all alternatives, modifications, and equivalents as may be reasonable included within the spirit and scope of the invention as defined by the appended claims.

What is claimed is:

1. An optical position detection apparatus including plural pairs of light emitting devices and photodetectors, each pair of said light emitting device and said photodetector being spaced from each other, being adapted to make adjustment to the light reception values of respective photodetectors when the light emitted from said light emitting devices toward said photodetectors is not interrupted by an object so as to eliminate any variation in the light reception values between photodetectors and compare said adjusted light reception values with a reference level to detect a position of an object, said optical position detection apparatus further comprising:
- a first computing control means for computing by arithmetic averaging at least a virtual medial position between two adjacent photodetectors and a virtual light reception value at the virtual position in accordance with the adjusted light reception value of said photodetector and the adjusted light reception value of a photodetector adjacent to said photodetector,
- a comparison means for comparing said virtual light reception value and the adjusted light reception values of the respective photodetectors with the reference level so as to determine a presence or absence of light interruption by an object,
- a memory means for storing the position of the corresponding photodetector and the virtual position thereof as a light interruption position data when the presence of light interruption by an object has been determined by said comparison means, and
- a second computing control means for computing the arithmetic mean between a minimum light interruption position data and a maximum light interruption position data as a position of the object interruption position data for a series of positions stored in said memory means.

2. A method for detecting an optical position, disposing plural pairs of light emitting devices and photodetectors with each pair of said light emitting device and said photodetector being spaced from each other, making adjustment of the light reception values of the respective photodetectors so as to eliminate any variation in the light reception values between photodetectors when the light emitted from said light emitting devices toward said photodetectors is not interrupted by an object and comparing the adjusted light reception values with a reference level to detect a position of the object, said method further comprises the steps of:
- computing by arithmetic averaging at least a virtual medial position between two adjacent photodetectors and a virtual light reception value at the virtual position in accordance with the adjusted light reception value of said photodetector and the adjusted light reception value of a photodetector adjacent to said photodetector,
- comparing said virtual light reception value and the adjusted light reception values of the respective photodetectors with the reference level to determine the presence of light interruption by an object,
- storing the position of the corresponding photodetector and said virtual position as the light interruption position data when light interruption by an object has been decided, and
- computing arithmetic mean between the minimum and maximum light interruption position data as a position of the object interrupting the light when there are stored in said memory means the light interruption position data for a series of positions.

3. The method as claimed in claim 2, further comprising the steps of;
- computing a second virtual light reception value in accordance with the arithmetic mean of said virtual light reception value and said adjusted light reception value, and comparing said respective second virtual light reception values with said reference level and storing said second virtual light reception value as a light interruption position data when light interrupted by the object has been decided.

* * * * *